Dec. 13, 1927.

W. E. MATHIS 1,652,249

CABLE CONSTRUCTION

Filed March 8, 1927

Inventor

William E. Mathis,

By Clarence A. O'Brien
Attorney

Patented Dec. 13, 1927.

1,652,249

UNITED STATES PATENT OFFICE.

WILLIAM EUGENE MATHIS, OF ELKHART, INDIANA.

CABLE CONSTRUCTION.

Application filed March 8, 1927. Serial No. 173,780.

The present invention relates to an improved article of manufacture, such as may be broadly entitled a special cable construction, but more specifically, defined as an automobile tire locking device.

In order to render the foregoing more definite, I desire to point out that the novelty in the present case is directed in one instance, to a new form of cable adapted for many purposes. For example, I may provide a cable such as is particularly adapted for use in the formation of automobile tire locks, but which is in no sense restricted to such use, due to the fact that it is equally well usable as a substitute for suspension elements employed in playground swings and equipment, as a tow line for automobiles, as an anchor for outboard motors, and for various other purposes where covered flexible wire cables may be used.

Briefly, the improvements reside in provision of a wire cable which serves as a flexible core for location within an outer flexible smooth surfaced casing, the ends of these parts being connected with solid terminals nicely finished, and carefully protected.

Whereas, the invention in its broadest aspect, is directed to an improved cable structure of the general type referred to, the cable is shown in the present embodiment as forming a major portion of an improved type of automobile tire locking device, the ends of the cable in this arrangement being adapted particularly for practical association with a padlock.

The features and advantages of the device as used as an automobile tire locking device, will become more readily apparent from the following description and drawings.

In the drawing:—

Figure 1:
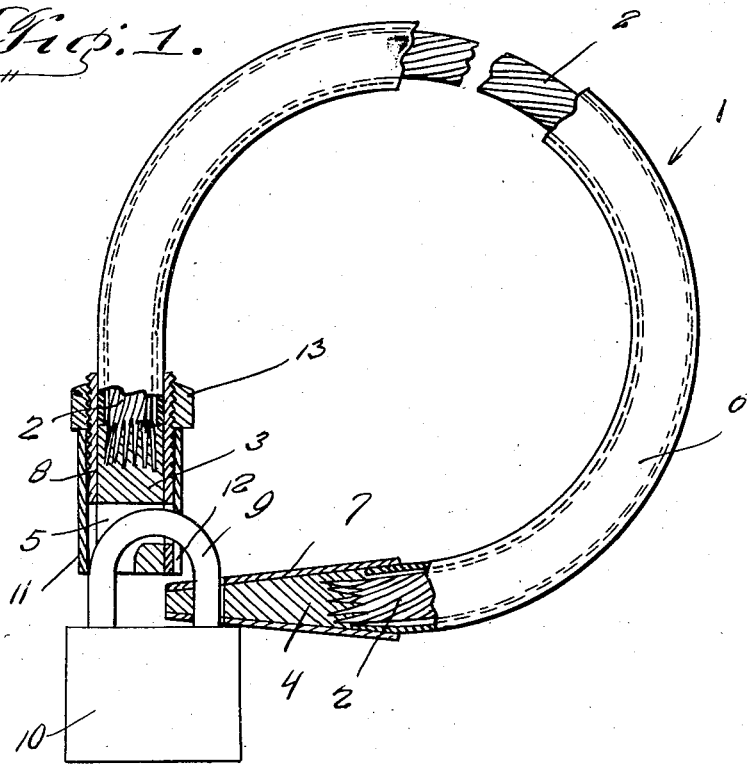
Figure 1 is a view in section and elevation showing the improved cable construction and indicating how it is made to operate as a major part of a novel tire locking device.

Referring now to the drawings in detail, it will be seen that the reference character 1 designates the cable as constructed in accordance with the present invention.

As before implied, this part comprises a stranded wire core 2 of appropriate dimension. Brazed, babbitted, or otherwise securely connected to the opposite ends of the core are solid metal terminals 3 and 4 respectively. The terminals have been designated by different numerals because of the fact that they are slightly different in configuration.

In the present embodiment the terminal 4 is tapered toward its outer end and provided adjacent the outer end with a hole, which serves a purpose to be hereinafter described. On the other hand, the terminal 3 is substantially cylindrical in cross section, and is provided at its free end with a substantially right angular hole 5.

Surrounding the metal core is a casing which is preferably formed of a rubber composition of appropriate texture. This casing is designated by the reference character 6 and it is connected at its opposite ends to the terminals 3 and 4. In this connection, it will be noticed that a separate metal tip 7 is fastened to the terminal 4 and has its inner end extended across the joint between this terminal and the rubber casing, as shown plainly in Fig. 1. This is provided by a secure connection between the parts and prevents damaging of the rubber casing end by properly enclosing and sealing it.

The corresponding tip 8 on the terminal 3 of course corresponds in shape to this terminal, and in the present embodiment this is provided with openings registering with the opening 5 and provided with external screw threads. At this point, I wish to direct attention to the fact that the rubber casing does not adhere to the surface of the core. Instead, an air space is left which functions somewhat as a cushion. It is believed, that by leaving the rubber casing free of connection with the core, the flexibility of the core is not impaired, and a more comfortable grip is provided, particularly when the cable is used as a substitute for ropes, chains in the construction of playground swings, etc.

Figure 2:
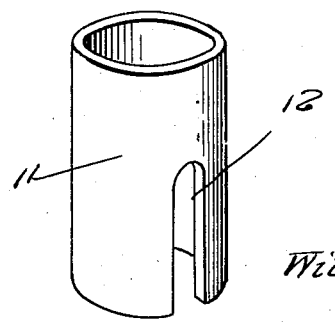
Fig. 2 is an enlarged perspective view of one of the details.

Considering now the use of the cable as the major part of the locking device represented, it will be noticed that the tip 7 and the terminal 4 are formed with alined holes to accommodate the shackle 9 of a padlock 10. Moreover, the terminal 3, being provided with a hole 5, accommodates this shackle. To add to the rigidity and to insure proper retention of parts, I provide a sleeve 11 of the construction shown better in Fig. 2.

This sleeve is provided at one end with an elongated slot 12 which straddles the shackle on one side. The opposite side of the sleeve however, is imperforate to operate as a closure for the opening or recessed portion 5. This sleeve slidably surrounds cylindrical tip 8, and it is pressed firmly down against the shackle through the medium of a retaining nut 13, arranged on the screw threads and bearing against one end of the sleeve.

In connection with the foregoing, I wish to point out that the rubber tubing or casing does not adhere to the cable as in insulation, but has an air space which enhances the flexibility of the cable. The tubing protects the cable from the weather and dirt and affords a smooth surface that will not mar or scratch other objects which it rubs or chafes. Also the cable adds to the difficulty of cutting or nipping the stranded wires of the cable, thus adding to the strength and security of the structure. The method of joining the parts prevents marring, by holding them rigid and against undue swinging and clinking.

An effective seal for the cable end is provided to prevent dirt accumulation and to protect the metal from the elements. The casing and cables being flexible, the entire device can be attached to many places and used in various manners. It has sufficient rigidity to permit it to be passed through small openings in places difficult of access, which is not permitted with a cable which is too flexible and which includes a chain core.

A smooth hand gripping surface is provided which protects the hands when handling the device. When using the cable in connection with the tire locking device, it serves to keep the padlock at all times in place and to prevent loss or misplacing.

It is plain to be seen that I have attempted to amplify and emphasize the novel construction of the cable, adapted for a general use but especially shown in the present embodiment as the major part of a tirelocking device, which is in itself a highly individual structure when compared with other known marketed and patented devices for the same purpose.

Undoubtedly persons skilled in the art to which the invention resides, will be able to obtain a clear understanding of the same after considering the description in connection with the drawings. In view of this, a more lengthy description is thought unnecessary.

Having thus described my invention, what I claim as new is:—

1. In a structure of the class described, a cable embodying a flexible metal core surrounded by a flexible casing, said casing being free of connection with the surface of the core to provide an intervening air space, metal terminals with which the ends of the casing and core are rigidly connected, together with additional tips forming caps surrounding the terminals and bridging the joint between the casing and terminals to protect said joint against destruction.

2. In a tire locking device of the character described, a rubber covered flexible core provided at its opposite ends with rigidly mounted solid terminals having openings constructed to accommodate the shackle of a padlock, and a slidable locking sleeve surrounding one terminal and cooperable with said shackle.

3. In a tire locking device of the character described, a rubber covered flexible core provided at its opposite ends with rigidly mounted solid terminals having openings constructed to accommodate the shackle of a padlock, metal caps carried by said terminals, one of said caps being screw threaded and of cylindrical form, a slotted sleeve slidably mounted on said cylindrical cap, and retaining nuts on the screw threaded portion cooperable with the sleeve.

In testimony whereof I affix my signature.

WILLIAM EUGENE MATHIS.